US008777544B1

(12) United States Patent
Carpenter

(10) Patent No.: US 8,777,544 B1
(45) Date of Patent: Jul. 15, 2014

(54) STORAGE MEANS AND SHIPPING METHOD FOR MOTORCYCLES

(76) Inventor: Robert H. Carpenter, Pasadena, CA (US)

( * ) Notice: Subject to any disclaimer, the term of this patent is extended or adjusted under 35 U.S.C. 154(b) by 435 days.

(21) Appl. No.: 12/722,120

(22) Filed: Mar. 11, 2010

Related U.S. Application Data

(60) Provisional application No. 61/209,668, filed on Mar. 11, 2009.

(51) Int. Cl.
*B66F 7/24* (2006.01)

(52) U.S. Cl.
USPC .......................................... 414/537; 414/430

(58) Field of Classification Search
CPC .. B65D 2585/6865; B62B 5/049; B66F 7/246
USPC ........................ 414/430, 537; 410/3; 280/79.4
See application file for complete search history.

(56) References Cited

U.S. PATENT DOCUMENTS

| 1,487,584 | A | * | 3/1924 | McCarthy | 280/79.4 |
| 2,350,118 | A | * | 5/1944 | Knapp | 414/430 |
| 2,738,984 | A | * | 3/1956 | Korchan | 280/652 |
| 3,785,517 | A | | 1/1974 | Brajkovich | |
| 4,350,470 | A | * | 9/1982 | Murillo | 414/430 |
| 5,133,453 | A | * | 7/1992 | Fritze | 206/335 |
| 5,593,259 | A | * | 1/1997 | Kuo | 410/3 |
| D378,155 | S | | 2/1997 | Bartow et al. | |
| 5,609,461 | A | | 3/1997 | Lichtenberg | |
| 6,095,746 | A | | 8/2000 | Bergin | |
| 6,102,645 | A | * | 8/2000 | Kooima et al. | 414/537 |
| 6,575,310 | B2 | | 6/2003 | Chamoun | |
| 6,648,300 | B2 | | 11/2003 | Chamoun | |
| D495,107 | S | | 8/2004 | Thurm | |
| 6,935,619 | B2 | | 8/2005 | Chamoun | |
| 7,021,461 | B1 | * | 4/2006 | Robey | 206/335 |
| 2007/0237613 | A1 | * | 10/2007 | Randers | 414/426 |

* cited by examiner

*Primary Examiner* — Jonathan Snelting
(74) *Attorney, Agent, or Firm* — Montgomery Patent & Design; Robert C. Montgomery

(57) ABSTRACT

A storage means and transportation method for at least one (1) motorcycle is herein disclosed, comprising a platform plate supported at corner locations by rotating casters. A vertical edging is provided along the long edges of the platform to prevent the motorcycle from rolling off. At least one (1) handles is provided along the long edge to aid in manipulating each motorcycle along a floor surface for shipping or storage. At each end portion of the platform are fold-down ramps to allow each motorcycle to be rolled on and off of the platform. Each ramp comprises a support to anchor the platform against the floor surface by lifting the casters slightly off of the floor. Once the platform is secured in this fashion, each motorcycle can be rolled on and off the platform safely. Each motorcycle is covered by a fiberglass hard cover which is attached thereto the platform for long-term storage and/or shipment.

4 Claims, 6 Drawing Sheets

STORAGE MEANS AND SHIPPING METHOD FOR MOTORCYCLES

RELATED APPLICATIONS

The present invention was first described in and claims the benefit of U.S. Provisional Application No. 61/209,668 filed Mar. 11, 2009, the entire disclosures of which are incorporated herein by reference.

FIELD OF THE INVENTION

The present invention relates generally to motorcycles, and in particular, to a storage device and a shipping method for motorcycles.

BACKGROUND OF THE INVENTION

Motorcycles represent an increasing sector of the motor vehicle industry. Their cheap maintenance and fuel costs and avid customer loyalty make such vehicles an ever popular presence on the market. However, the use of such vehicles is not suited for all situations. In some cases motorcycles must be transported from one (1) location to the next without the actual running of the motorcycle. Such transactions often occur between the point of manufacture and the point of sale, during resale of the vehicle when a buyer must travel in order to purchase the motorcycle, and the like.

Various attempts have been made to provide apparatuses which aid in the lifting or transport of motorcycles and the like. Examples of these attempts can be seen by reference to several U.S. patents. U.S. Pat. No. 3,785,517, issued in the name of Brajkovich, describes a motorcycle carrier and chock adapted for securing and transporting a motorcycle via a truck, trailer or similar existing vehicle.

U.S. Pat. No. 5,609,461, issued in the name of Lichtenberg, describes a motorcycle dolly adapted for the local transport of a motorcycle via a rolling apparatus, thus allowing a user to move the motorcycle easily and without need to run the motorcycle.

U.S. Pat. No. 6,575,310, issued in the name of Chamoun, describes a motorcycle lift. The Chamoun apparatus comprises a platform and a mechanism adapted for easily and securely lifting a motorcycle positioned on the platform.

Additionally, ornamental designs for a motorcycle lift exist, particularly U.S. Pat. Nos. D 378,155 and D 495,107. However, none of these designs are similar to the present invention.

While these apparatuses fulfill their respective, particular objectives, each of these references suffer from one (1) or more of the aforementioned disadvantages. Many such apparatuses do not provide protection or storage capabilities. Also, many such apparatuses are suitable only to particular situations. In addition, many such apparatuses are bulky or complicated, making them difficult for a single user to operate. Accordingly, there exists a need for an apparatus adapted for the transport and manipulation of motorcycles without the disadvantages as described above. The development of the present invention substantially departs from the conventional solutions and in doing so fulfills this need.

SUMMARY OF THE INVENTION

In view of the foregoing references, the inventor recognized the aforementioned inherent problems and observed that there is a need for a means to provide a storage and shipping method for motorcycles which combines features of lifting, wheeling, and transportation and provides a secure, protective storage means to the motorcycle in a manner which is easily manageable by a single user. Thus, the object of the present invention is to solve the aforementioned disadvantages and provide for this need.

To achieve the above objectives, it is an object of the present invention to comprise a storage means and shipping method for motorcycles. The system comprises a base assembly, ramp assemblies, a plurality of casters, and a push bar constructed of rugged materials, such as steel, aluminum, or the like.

Another object of the present invention is to allow a user to easily manipulate the base assembly over a floor surface by means of the push bar and the plurality of casters. The casters provide a rolling means to the system in a conventional manner. The push bar comprises a plurality of "U"-shaped tubular handles removably attachable to the base assembly by means of a plurality of sockets located along a perimeter of the base assembly.

Yet still another object of the present invention is to provide a protective enclosure to cover the motorcycle, especially during extended periods of storage. The enclosure comprises a one-piece molded cover corresponding to the dimensions of the base portion and a height suitable to receive a motorcycle. The base provides attachment to the cover via a plurality of latching pins located at corner positions along the base. The cover protects the motorcycle from environmental effects such as moisture, dust, physical contact, and the like.

Yet still another object of the present invention is to provide a user with a secure means of positioning and manipulating the motorcycle on the base assembly by means of a high-friction surface of the base assembly. The base assembly further comprises a pair of foot rests hingedly attached to intermediate side portions of the base which deploy outward and provide a firm stance to an operator while positioned on the motorcycle.

Yet still another object of the present invention is to allow efficient loading of the system onto a transportation device with a conventional forklift, via a plurality of standard channel-shaped receivers located beneath the base assembly.

Yet still another object of the present invention is to provide a stable inclined surface for easy loading and unloading of a motorcycle onto the system by means of a pair of ramp assemblies located at each end of the base assembly. Each ramp assembly comprises a ramp floor with side panels which is hingedly moveable between a vertical position and a deployed inclined position.

Yet still another object of the present invention is to provide securement of the system when the ramp is deployed by means of a lift plate and locking mechanism. The lift plate comprises a "J"-shaped plate which contacts a floor surface during deployment of the ramps, lifting the base assembly slightly and transferring weight off of the casters and onto the lift plate. The lift plate prevents rolling of the system during use of the ramps. The locking mechanism allows a user to secure the ramps in place in their vertical position for secure transport.

Yet still another object of the present invention is to provide a method of utilizing the device that provides a unique means of securing the system in place, easily rolling a motorcycle onto the assembly and positioning it by means of the ramp and foot rests, folding the system by means of the platform and foot rest hinges, securing a cover over the motorcycle, easily moving the system into place by means of the push bar and casters, and placing the protected motorcycle for transport on an existing vehicle with the use of a forklift in a conventional manner.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
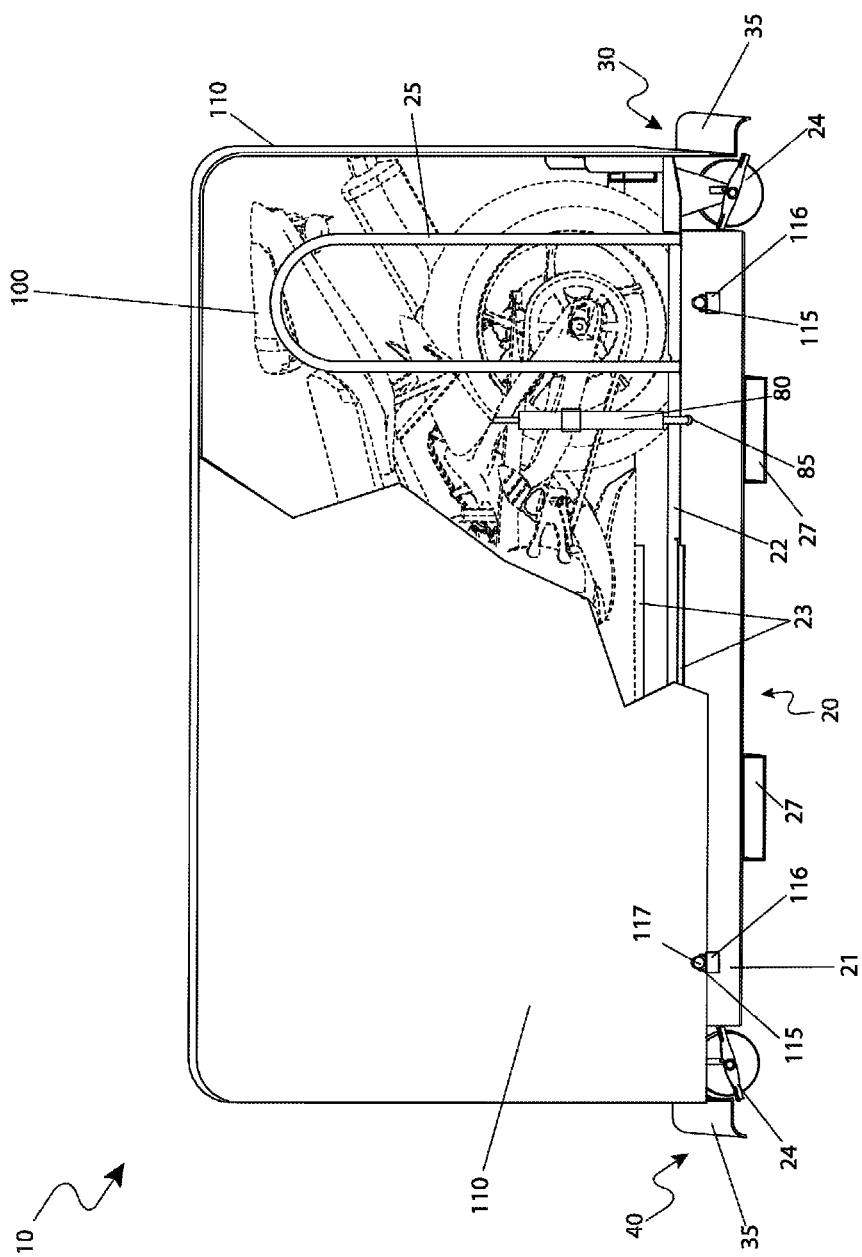
FIG. 1 is a side cut-away view of a storage means and shipping method for motorcycles 10, according to a preferred embodiment of the present invention.

DESCRIPTIVE KEY 10 storage means and shipping method for motorcycles
20 base assembly
21 base side panel
22 base floor panel
23 foot rest
24 caster
25 push bar
26 socket
27 forklift aperture
28 foot rest hinge
30 first ramp assembly
31 ramp hinge
32 ramp floor
33 ramp side panel
34 handle
33 lift plate
36 locking mechanism
40 second ramp assembly
80 tie-down fastener
85 tie-down aperture
100 motorcycle
110 hard-cover
115 latching pin
116 locking device
117 latching aperture
120 soft-cover
130 transportation vehicle
135 fork truck
140 rack storage unit

DETAILED DESCRIPTION OF THE PREFERRED EMBODIMENT

Figure 2A:
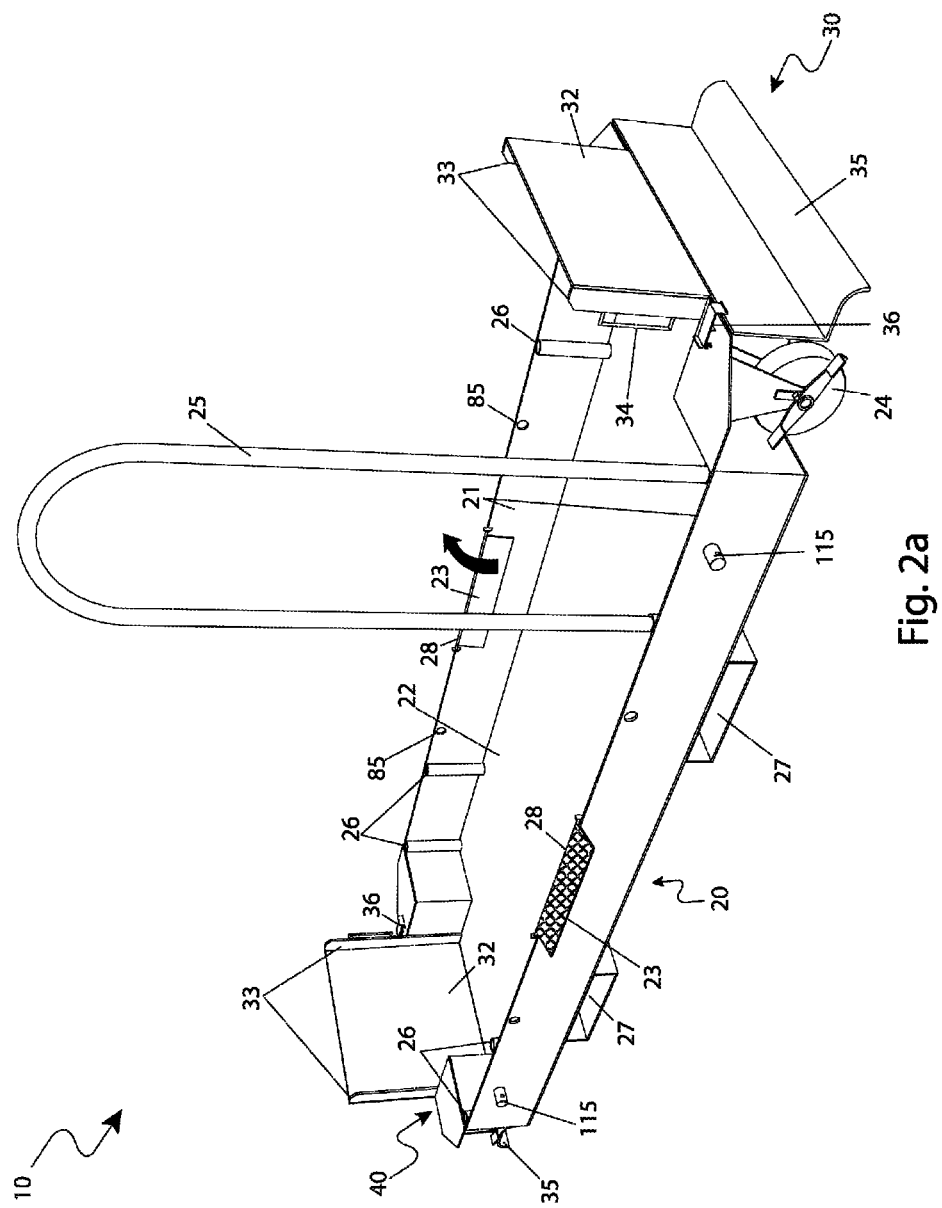
FIG. 2a is a side perspective view of a storage means and shipping method for motorcycles 10 depicting a first ramp assembly 30, according to a preferred embodiment of the present invention.
Figure 2B:
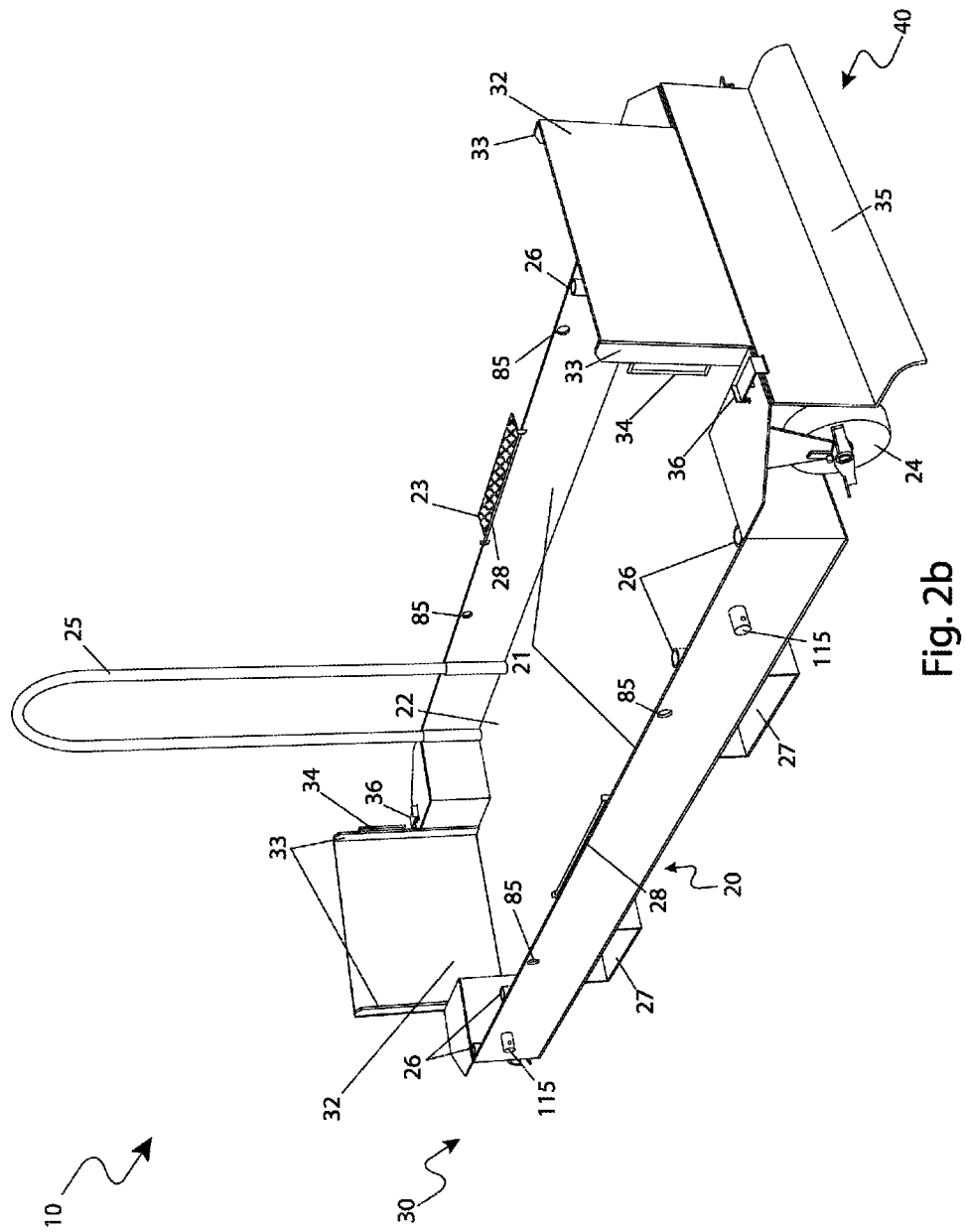
FIG. 2b is an opposing side perspective view of a storage means and shipping method for motorcycles 10 depicting a second ramp assembly 40, according to a preferred embodiment of the present invention.
Figure 3A:
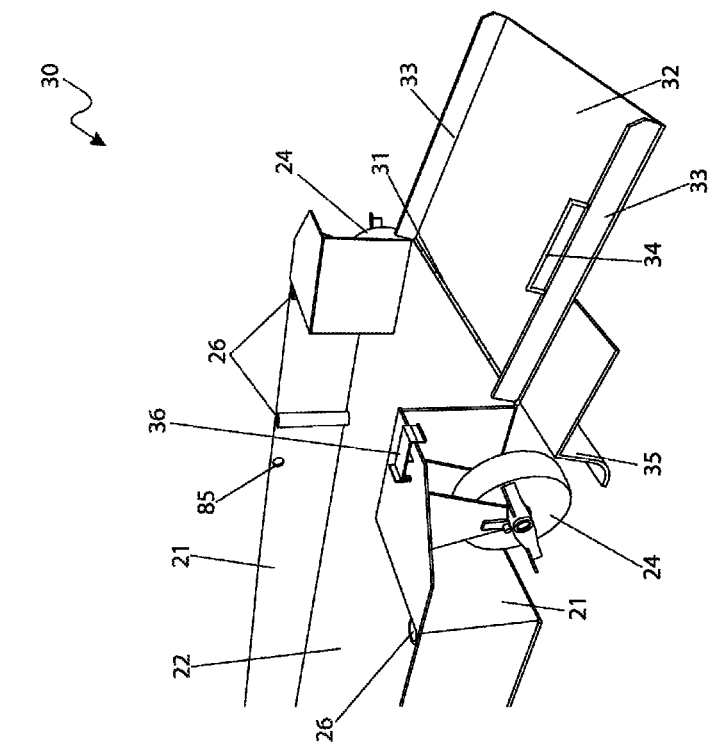
FIG. 3a is a perspective view of a first ramp portion 30 depicting a stored state, according to a preferred embodiment of the present invention.
Figure 3B:
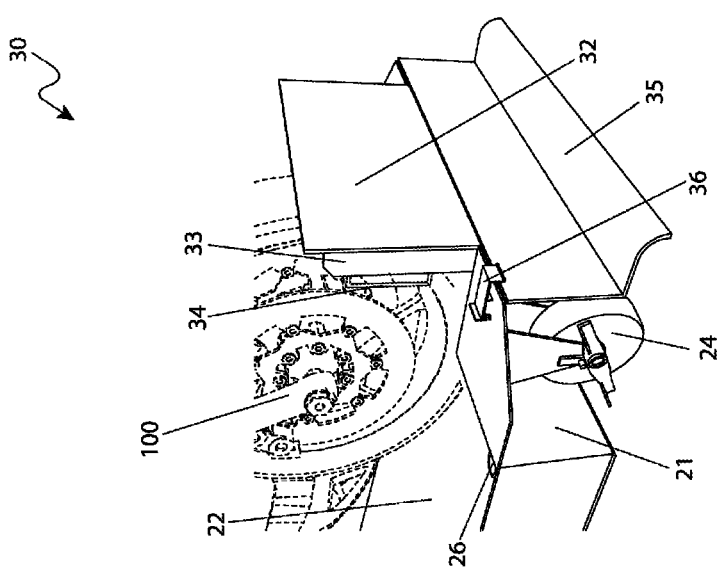
FIG. 3b is a perspective view of a first ramp portion 30 depicting a loading state, according to a preferred embodiment of the present invention.
Figure 4:
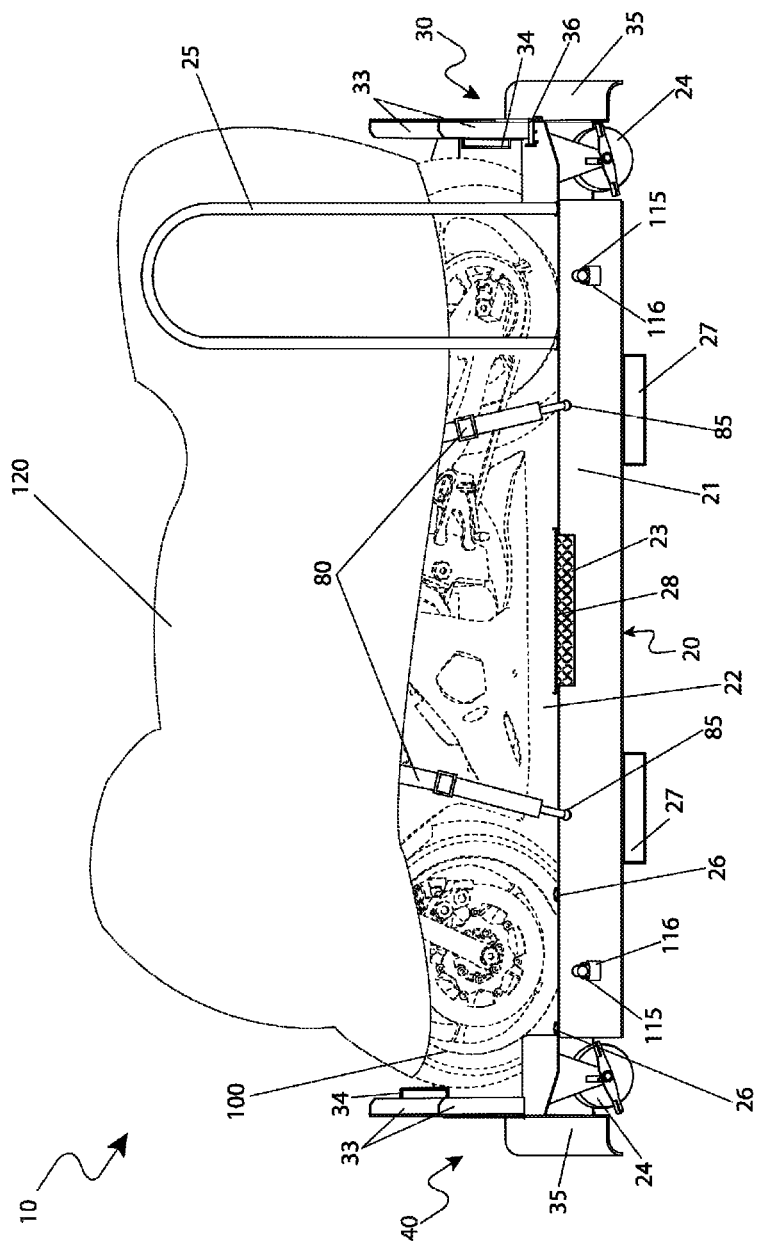
FIG. 4 is a side perspective view of a storage means and shipping method for motorcycles 10 depicting a soft-cover 120, according to an alternate embodiment of the present invention; and, FIG. 5 is a perspective view of the means and shipping method for motorcycles 10 depicting tractor trailer transportation thereof, according to a preferred embodiment of the present invention.

The best mode for carrying out the invention is presented in terms of its preferred embodiment, herein depicted within FIGS. 1, 2a, 2b, 3a, 3b, and 5, and in terms of an alternate embodiment as depicted in FIG. 4. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a system and method for a storage means and shipping method for motorcycles (herein described as the "system") 10, which comprises a rectangular base plate 20 with approximate dimensions of thirty (30) to thirty-six (36) inches wide and approximately eight (8) feet long. The system 10 is envisioned being made using rugged metal materials such as, but not exclusively, aluminum, steel, or the like. The base portion 20 comprises a swivel caster 24 at each corner and side panels 21 approximately six (6) inches high along outer edges to prevent a motorcycle 100 from rolling off. The system 10 also provides one (1) or more inverted "U"-shaped push bars 25 being approximately three (3) feet high and affixed thereto the side panels 21 to aid in manipulation of the system 10 along a floor surface. Located at respective end portions of the base 20 are a first ramp assembly 30 and a second ramp assembly 40, each allowing the motorcycle 100 to be easily rolled on and off of the system 10. When each ramp 30, 40 is in its lowered position, respective "J"-shaped lift plates 35 being subjacent thereto contact said floor surface, thereby lifting the casters 24 slightly. The combined weight of the system 10 and the motorcycle 100 is in turn redistributed from the casters 24 thereto the floor surface to stabilize a position of the system 10. This lifting motion produced by the lift plates 35 allows the motorcycle 100 to be rolled on and off the base 20 safely and easily. Finally, the system 10 provides attachment of a protective fiberglass hard-cover 110 for shipping and/or storage. The system 10 allows for efficient and protective long distance shipment of motorcycles 100 using a transportation vehicle 130 such as a customized tractor trailer.

Referring now to FIG. 1, a side cut-away view of the system 10, according to the preferred embodiment of the present invention, is disclosed. The system 10 provides secure and protective enclosure and transportation of a motorcycle 100 being supported using a center or side-type kickstand portion of said motorcycle 100 thereupon the system 10. The system 10 comprises a base assembly 20, four (4) casters 24, at least one (1) push bar 25, a plurality of tie-down fasteners 80, a plurality of tie-down apertures 85, and a hard-cover 110. The base assembly 20 comprises a rugged metal weldment resembling a pallet-like structure providing a flat surface capable of supporting a conventional 2-wheeled motorcycle 100. The base assembly 20 is envisioned being approximately thirty (30) to thirty-six (36) inches wide and approximately eight (8) feet long; however, it is understood that the base assembly 20 may be provided in different lengths which correspond thereto motorcycles 100 of differing lengths, for example, small, medium, and large sizes. The base assembly 20 further comprises side panels 21 along a long axis thereof, a first ramp assembly 30, and a second ramp assembly 40. The ramp assemblies 30, 40 are located at each end portion of the system 10 (see FIGS. 2a, 2b, 3a, and 3b). The casters 24 are envisioned to be commercially available heavy-duty ball-bearing units capable of pivoting a full 360-degrees and comprising standard locking mechanisms. The push bar 25 comprises an approximately three (3) foot high inverted "U"-shaped handle made using tubular metal providing responsive manual manipulation of the system 10 by an individual over a flat paved surface such as a garage, shipping dock, or the like. The system 10 is illustrated here with a single push bar 25 installed; however, it is envisioned that up to four (4) push bars 25 may be provided each being removably attached thereto the base assembly 20 at each corner location via a plurality of welded sockets 26 (see FIGS. 2a and 2b). The side panel portions 21 of the system 10 further comprise a plurality of tie-down apertures 85 providing an anchoring means thereto a plurality of common tie-down fasteners 80 in-turn providing a means with which to secure attachment point portions of the motorcycle 100 to the base assembly 20 portion of the system 10. The tie-down fasteners 80 are envisioned to be strong common tension devices such as, but not limited to: ratcheting tie-downs, friction tie-downs, rope, cable/hook units, bungee straps, or the like being capable of supporting an anticipated weight of a motorcycle 100 during transit.

The hard cover 110 provides a protective enclosure to cover the motorcycle 100 being especially effective during extended periods of storage. Said hard cover 110 protects said motorcycle 100 therefrom environmental effects such as moisture, dust, falling objects, sunlight, and the like. The hard cover 110 comprises a one-piece molded structure or an assembly of multiple molded or cast fiberglass portions corresponding thereto length and width dimensions of the base portion 20 as well as a height dimension suitable to enclose a motorcycle 100. The base 20 provides an attachment means thereto said hard cover 110 via a plurality of horizontally protruding latching pins 115 located at corner positions along the base side panel portions 21. Said latching pins 115 comprise a cylindrical metal shape approximately two (2) inches long and one (1) inch in diameter. Said latching pins 115 pass therethrough latching apertures 117 in the hard cover 110 and are subsequently secured in place via a through-hole at an end portion of said latching pin 115 allowing insertion of a padlock or other locking device 116.

Referring now to FIG. 2 FIGS. 2a and 2b, a side perspective view of the system 10, according to the preferred embodiment of the present invention, is disclosed. The system 10 is shown here with the hard cover 110 removed to illustrate additional features of the system 10. The system 10 comprises a base floor panel 22, a pair of foot rests 23, a plurality of sockets 26, and a pair of forklift apertures 27. The base floor panel 22 comprises a large metal surface envisioned to comprise a high-friction surface utilizing such technologies as a spray-on rubberized coating, a rubber mat affixed thereto using adhesives, a "fish-plate" surface, or the like. Said high-friction surface provides protection from slipping and sliding during loading/unloading of the motorcycle 100. The foot rests 23 comprise small fold-out horizontal platforms approximately a size of one's foot located at an intermediate positioned along each base side panel 21. Each foot rest 23 comprises a textured upper surface using a fish-plate or rubberized surface, thereby providing a firm stance thereto the operator while positioned thereon said motorcycle 100. Each foot rest 23 also comprises an axial foot rest hinge 28 affixed thereto respective base side panels 21 so as to pivot the foot rest 23 from a stored position within the base side panel 21 outwardly to form wing-like appendages for a user to rest his/her feet during a loading/unloading task Likewise, the foot rests 23 may be pivoted inwardly for compact storage of the system 10, thereby allowing adjacent units of the system 10 to abut thereagainst each other in a parallel fashion. The sockets 26 are arranged in pairs to provide a receiving attachment means thereto the aforementioned respective tubular push bars 25. The sockets 26 comprise pairs of round tubular apertures being welded thereto the base side panels 21 along inner vertical surfaces. Said sockets 26 are sized and spaced so as to slidingly receive said push bars members 25 thereinto and are located at forward and rearward locations along said base side panels 21. One (1) to four (4) push bars 25 may be utilized to provide easy manipulation of the system 10 and occupying motorcycle 100 with minimal applied force by a user. The metallic portions of the system 10 are envisioned to be made using rugged metal materials such as, but not exclusively, aluminum, steel, or the like, and may be finished in a variety of colors and patterns using common metal finishing techniques such as, but not limited to: painting, powder coating, anodizing, plating, or may alternately retain a natural finish. The forklift apertures 27 comprise standard channel-shaped receivers suitable for fork portions of a conventional forklift 135. The forklift apertures 27 are welded thereto and extend side-to-side across a bottom surface of the base floor panel 22. The forklift apertures 27 are envisioned being made of similar materials as the aforementioned base 20 and allow efficient loading of the system units 10 onto and off of a transportation vehicle 130 (see FIG. 5).

Referring now to FIGS. 3a and 3b, perspective views of a first ramp portion 30 depicting a stored state and loading state, respectively, according to the preferred embodiment of the present invention, are disclosed. The first 30 and second 40 ramp assemblies provide a stable inclined surface for loading/unloading a motorcycle 100 thereonto the system 10. The second ramp assembly 40 is envisioned to comprise like construction, components, and materials as the first ramp assembly 30 being either an identical form or a mirror image thereof. The first ramp assembly 30 comprises a ramp hinge 31, a ramp floor 32, a pair of ramp side panels 33, a handle 34, a lift plate 35, and a locking mechanism 36. As illustrated here, the first ramp assembly 30 provides a pivoting transition from a secured vertical position thereto a deployed inclined position of the ramp floor portion 32 via a heavy-duty axial ramp hinge 31 envisioned to extend across an entire width thereof said first ramp assembly 30. The first ramp assembly 30 comprises a channel-shaped weldment being approximately fourteen (14) inches wide and having a ramp floor portion 32 and a pair of ramp side panels 33. The ramp floor portion 32 is envisioned to provide a similar high-friction surface as the aforementioned base floor panel 22 as well as an integral gripping handle 34 affixed thereto a single ramp side panel 33. The ramp floor 32 comprises an integral lift plate 35 being formed or welded thereto at a right angle along a lower edge. The lift plate 35 provides a stabilizing means thereto a position of the system 10 thereupon a floor surface. During deployment of the ramp floor 32, a curved lower edge portion of the lift plate 35 pivots downwardly making contact therewith said floor surface, thereby lifting the base assembly 20 slightly and transferring weight off the casters 24 and onto said lift plate 35. The locking mechanism 36 provides a means to secure the ramp assembly 30 in a vertical orientation, thereby providing additional containment thereto the occupying motorcycle 100. The locking mechanism 36 comprises a foot-activated pivoting design providing automatic latching engagement along a rear edge of the ramp floor portion 32 when in a vertical orientation (see FIG. 3a). However, it is understood that the locking mechanism 36 may utilize various alternate latching designs such as, but not limited to: locking rods, quick-disconnect pins, and other latching mechanisms to secure the ramp floor portion 35 therein a vertical orientation, and as such should not be interpreted as a limiting factor of the invention 10.

Referring now to FIG. 4, a side perspective view of the system 10 depicting an alternate soft-cover 120, according to an alternate embodiment of the present invention, is disclosed. The system 10 may also utilize a soft cover 120 based upon particular shipping or storage requirements or to provide economic protection of the motorcycle 100. The soft-cover 120 comprises a form-fitting textile enclosure envisioned being introduced in a variety of sizes corresponding to particular motorcycle models 100. The soft-cover 120 comprises features such as, but not limited to: a sewn or molded form-fitting shape, a plurality of tie-down fasteners, reinforced sewn borders, various colors and patterns, various indicia, synthetic or natural waterproof materials, and the like. The soft-cover 120 is envisioned to be produced using conventional textile assembly techniques such as sewing, plastic welding, adhesives, and the like, being common in the industry.

Figure 5:
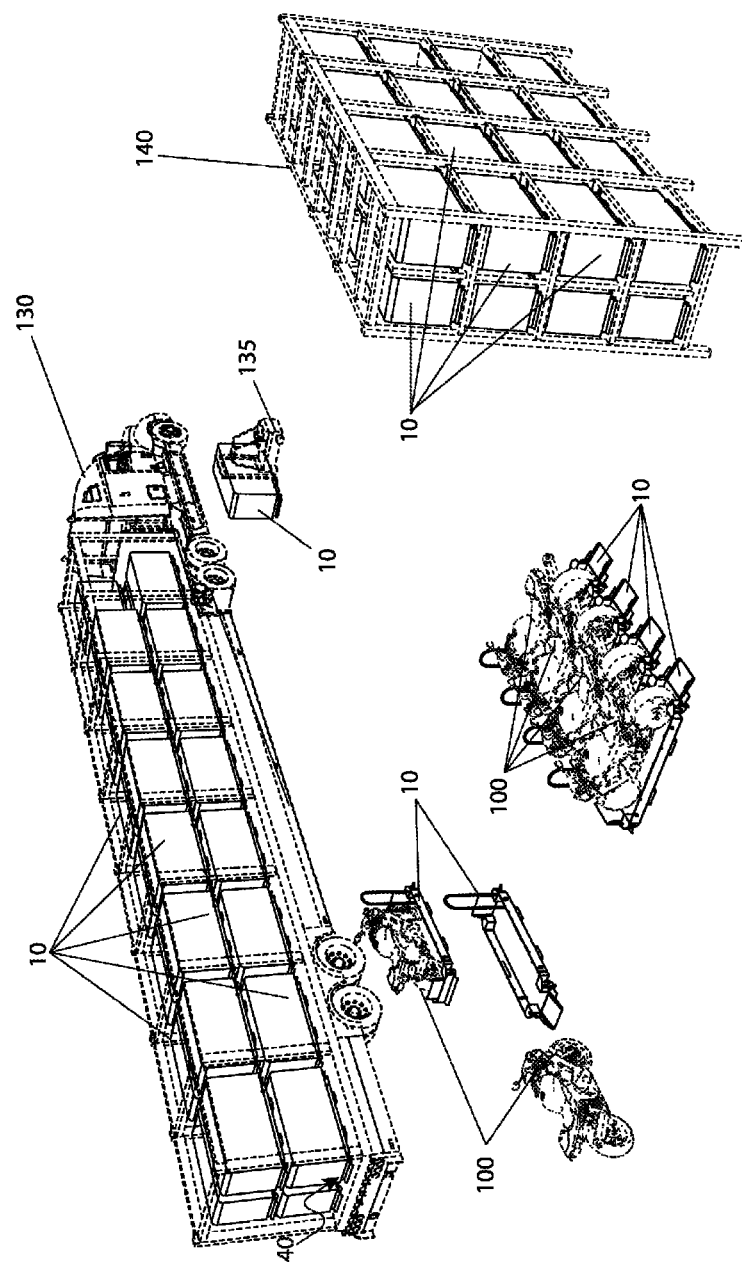

Referring now to FIG. 5, a perspective view of the system 10 depicting tractor trailer transportation thereof, according to a preferred embodiment of the present invention, is disclosed. The system 10 is illustrated here depicting a large number of system units 10 loaded thereonto a customized tractor trailer 130 using a standard forklift 135. It is understood that similar methods and rack-like storage units 140, as shown here, may also be incorporated thereinto railroad cars and other transportation vehicles 130, thereby providing efficient shipping of said system units 10. Furthermore, said storage methods may provide suitable long-term storage of system units 10 using said rack storage units 140 therewithin warehouses and other long-term storage locations as well.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the system 10, it would be utilized as indicated in FIG. 1 and alternately as indicated in FIG. 4.

The method of utilizing the preferred embodiment of the system 10 may be achieved by performing the following steps: positioning the system 10 thereupon a flat, paved surface, being in an empty state; removing the hard-cover portion 110 therefrom the base assembly 20 by removing the locking devices 116 therefrom the latching pins 115; deflecting said hard-cover 110 until said latching pins 115 are released therefrom the latching aperture portions 117 of the hard-cover 110; unlatching the locking mechanisms 36; pivoting the ramp assemblies 30, 40 downwardly using the handles 34; pressing thereagainst the ramp floors 32 using one's foot, thereby engaging the lift plates 35 with a floor surface to lift the base assembly 20 and casters 24 slightly therefrom said floor surface; pivoting the two (2) foot rests 23 outwardly to a deployed external position; pushing or riding a motorcycle 100 thereonto the base assembly 20 using either the first 30 or second 40 ramp assembly; maneuvering the motorcycle 100 until both motorcycle wheels are correctly positioned thereupon the base floor panel 22; deactivating the motorcycle motor in a normal manner, if running; placing one's feet upon the foot rests 23 for added stability during loading of the motorcycle 100; extending a kickstand portion of the motorcycle 100 for lateral support in a normal manner; pivoting the ramp assemblies 30, 40 to a vertical stored state; securing said ramp assemblies 30, 40 therein a vertical orientation by latching the locking mechanisms 36; installing one (1) to four (4) push bars 25 therein the sockets 26; installing a sufficient number of tie-down fasteners 80 thereto corresponding tie-down apertures 85, thereby providing additional stability thereto the motorcycle 100 during transit; manipulating the system 10 along a floor surface as desired using the push bars 25 prior to installation of the hard-cover portion 110; preparing the system 10 and motorcycle 100 for shipment by installing the hard-cover portion 110 thereupon the base assembly 20; fastening said hard-cover 110 thereto the base side panels 21 at corner locations by inserting the latching pins 115 therethrough latching aperture portions 117 of the hard-cover 110; inserting desired securing fasteners and/or a locking device 116 therethrough said latching pins 115; utilizing the fork apertures 27 to load a desired number of system units 10 thereonto a transportation vehicle 130 such as a customized tractor trailer, railroad car, or the like using a fork truck 135 or similar lifting device; transporting said system units 10 and included motorcycles 100 thereto a desired location; unloading and removing the system units 10 therefrom the transportation vehicle 130 in like manner as the previously described loading procedure; manipulating the system units 10 for storage or to unload the motorcycles 100 therefrom the base assemblies 20 in a similar manner as previously described above; and, benefiting from versatile, compact, portable, and protective transportation of a motorcycle 100 using the present invention 100.

The method of utilizing the alternate soft-cover 120 embodiment of the system 10 may be achieved by performing the following additional steps: loading the motorcycle 100 thereonto the base assembly 20 as previously described; covering the motorcycle 100 using the soft-cover 120 in lieu of the hard-cover portion 110; securing the soft-cover 120 using tie-down fasteners 80; and, unloading the motorcycle 100 as previously described. Use of the alternate soft cover 120 may be desirable based upon factors such as consumer preferences, economics, climate, or shipping requirements.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A motorcycle storage and transportation system comprising:
   a base assembly for providing a flat surface adapted to support a motorcycle thereon;
   first and second ramp assemblies located at opposed end portions of said base assembly;
   a plurality of casters connected to said base assembly; and, a push bar for providing responsive manual manipulation of said base assembly over a floor surface;

wherein said casters are lifted above the floor surface when a corresponding one of said first and second ramp assemblies is pivoted to a lowered position such that said base assembly is maintained at a substantially stable position; and, wherein each of said first and second ramp assemblies comprises:
 a ramp floor pivotally connected to said base assembly;
 a pair of ramp side panels connected to said ramp floor;
 a gripping handle connected to one of said ramp side panels;
 a "J"-shaped lift plate configured in such a manner to stabilize a position of said base assembly upon a floor surface; and,
 a locking mechanism removably attached to said lift plate;

wherein said first and second ramp assemblies deploy said ramp floor to an inclined position from a secured vertical position; and, wherein, when said first and second ramp assemblies are pivoted to said lowered position, said lift plate engages said casters and thereby lifts said casters above the floor surface;

wherein a curved lower edge portion of each of said lift plates pivots downwardly and thereby contacts the floor surface thereby lifting said base assembly above the floor surface and transferring weight from said casters to said lift plates;

wherein said curved lower edge portion of each of said lift plates remains spaced from said casters when pivoted downwardly and contacting the floor surface;

wherein said ramp floor is registered perpendicular to said base assembly when said first and second ramp assemblies are pivoted to an upright position; and, wherein, when said first and second ramp assemblies are pivoted to said lowered position, said first and second ramp assemblies remain spaced laterally away from said casters relative to a center of said base assembly.

2. The motorcycle storage and transportation system of claim 1, wherein said base assembly comprises:
 a plurality of side panels;
 a plurality of tie-down fasteners connected to said side panels;
 a plurality of sockets located at said side panels for slidably receiving said push bar;
 a base floor panel connected to said side panels;
 a plurality of foot rests located at an intermediate position along each of said side panels; and,
 a pair of forklift apertures located beneath said base assembly.

3. The motorcycle storage and transportation system of claim 2, wherein said foot rests are pivotal from a stored position within said side panels to a second position outward of said side panels.

4. The motorcycle storage and transportation system of claim 1, further comprising: a hard cover connected to said base assembly, wherein said each of said side panels includes a plurality of horizontally protruding latching pins attached to said hard cover, and a plurality of locking devices coupled to said latching pins.

* * * * *